UNITED STATES PATENT OFFICE.

KURT DESAMARI, OSCAR GÜNTHER, AND HUGO SCHWEITZER, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYE.

1,052,135.     Specification of Letters Patent.     Patented Feb. 4, 1913.

No Drawing.     Application filed July 27, 1911. Serial No. 640,779.

*To all whom it may concern:*

Be it known that we, KURT DESAMARI, OSCAR GÜNTHER, and HUGO SCHWEITZER, residing at Elberfeld, and ARTHUR ZART, residing at Vohwinkel, near Elberfeld, Germany, doctors of philosophy, chemists, citizens of the German Empire, have invented new and useful Improvements in Azo Dye, of which the following is a specification.

The present invention relates to the manufacture and production of new azo dyestuffs capable of dyeing unmordanted cotton in from yellow to orange to brown-red shades which on being developed on the fiber become fast to washing.

The process for their production consists in converting into urea compounds the aminoazo compounds which are obtained by combining with suitable aromatic amins, such as ortho- or meta-toluidin, para-xylidin, cresidin; diazotized aminonaphthol compounds, such as aminonaphthols, their sulfonic acids and derivatives e. g. aminobenzoylaminonaphthol sulfonic acids, aminophenyloxynaphthimidazol sulfonic acids, which are substituted in the amino group by substituents containing a heteronuclear amino group capable of being diazotized. The urea compounds are produced in the usual way by treatment with phosgene.

The new dyes are after being dried and pulverized dark yellow powders soluble in water generally with a yellow color and soluble in concentrated sulfuric acid with a reddish to violet color. Upon reduction with stannous chlorid and hydrochloric acid an aminonaphthol compound and an urea of a diamin is obtained, which is split up into carbonic acid and a diamin.

In order to illustrate the new process more fully the following example is given, the parts being by weight:—239 parts of 1-amino-6-naphthol-3-sulfonic acid are diazotized with 69 parts of sodium nitrite and hydrochloric acid and the diazo compound is combined in a very slightly hydrochloric acid solution with 187.5 parts of cresidin hydrochlorid. The monoazo dyestuff is isolated from the hydrochloric acid solution and is dissolved in water containing an excess of sodium carbonate. Into this solution phosgene is passed through the solution, which has to be kept alkaline during this process and at a moderate temperature of about 40° C. until the dyestuff is completely converted into the urea compound. Subsequently the dyestuff is salted out and isolated. It has the formula:

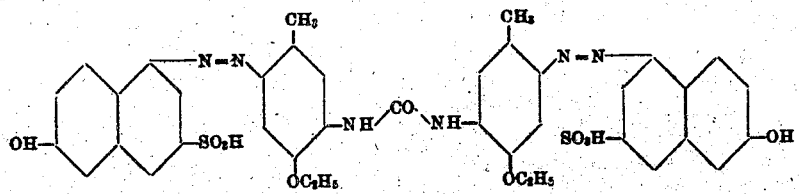

and dyes cotton in orange shades which after being developed with diazotized para-nitranilin yield a pure clear red-brown of excellent fastness to light and to washing, and capable of being discharged to a pure white.

It is in the shape of its alkaline salt a dark powder easily soluble in water with a yellow color and in concentrated sulfuric acid with a blue violet color; yielding upon reduction with stannous chlorid and hydrochloric acid 1.6-aminonaphthol-3-sulfonic acid and the symmetrical urea of 3.6-diaminocresolethylether

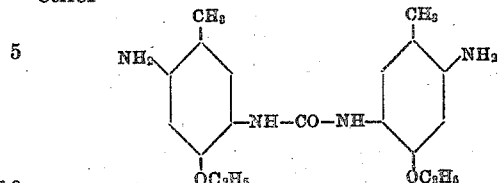

being further decomposed in 3.6-diaminoparacresolethylether and carbonic acid.

We claim:—

1. The new dyestuffs which are after being dried and pulverized dark yellow powders soluble in water generally with a yellow color and soluble in concentrated sulfuric acid with a reddish to violet color; yielding upon reduction with stannous chlorid and hydrochloric acid a monoaminonaphthol compound and an urea of a diamin; dyeing unmordanted cotton in from yellow to orange to brown-red shades which on being developed on the fiber with diazotized para-nitranilin are of excellent fastness to washing and to light and are capable of being discharged to a pure white, substantially as described.

2. The new dyestuffs of the following general formula:

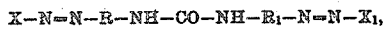

where R and $R_1$ are aromatic radicals, and X and $X_1$ are the radicals of naphthol sulfonic acids unsubstituted by amino groups, which are after being dried and pulverized dark powders soluble in water generally with a yellow color and soluble in concentrated sulfonic acid with a reddish to violet color; yielding upon reduction with stannous chlorid and hydrochloric acid a monoaminonaphthol compound and an urea of a diamin; and dyeing unmordanted cotton in from yellow to orange to brown-red shades, substantially as described.

3. The new dyestuffs of the following general formula:

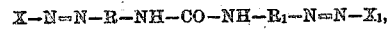

where R and $R_1$ are aromatic radicals and X and $X_1$ are the radicals of 6-naphthol-3-sulfonic acid, which are after being dried and pulverized dark powders soluble in water generally with a yellow color and soluble in concentrated sulfuric acid with a reddish to violet color; yielding upon reduction with stannous chlorid and hydrochloric acid 1-amino-6-naphthol-3-sulfonic acid and an urea of a diamin; and dyeing unmordanted cotton in from yellow to orange to brown-red shades, substantially as described.

4. The new dyestuffs of the following general formula:

where R and $R_1$ are aromatic radicals of the benzene series and X and $X_1$ are the radicals of oxy-naphthalenes unsubstituted by amino groups, which are after being dried and pulverized dark powders soluble in water generally with a yellow color and soluble in concentrated sulfuric acid with a reddish to violet color; yielding upon reduction with stannous chlorid and hydrochloric acid an aminonaphthol compound and an urea of a diamin; and dyeing unmordanted cotton in from yellow to orange to brown-red shades, substantially as described.

5. The new dyestuff having most probably the formula:

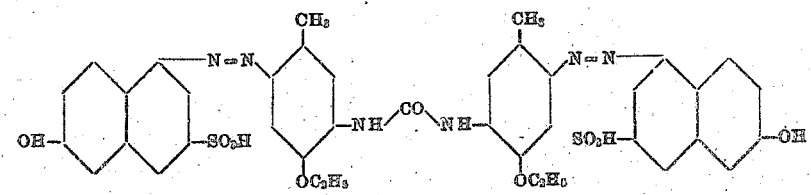

which is after being dried and pulverized a dark powder easily soluble in water with a yellow color and in concentrated sulfuric acid with a blue violet color; yielding upon reduction with stannous chlorid and hydrochloric acid 1.6-aminonaphthol-3-sulfonic acid and the symmetrical urea of 3.6-diaminocresolethylether which is further decomposed into 3.6-diaminoparacresolethylether and carbonic acid; dyeing cotton in orange shades which after being developed with diazotized para-nitranilin yield a pure clear red-brown of excellent fastness to light and capable of being discharged to a pure white, substantially as described.

In testimony whereof we have hereunto set our hands in the presence of two subscribing witnesses.

KURT DESAMARI. [L. S.]
OSCAR GÜNTHER. [L. S.]
HUGO SCHWEITZER. [L. S.]
ARTHUR ZART. [L. S.]

Witnesses:
ALBERT F. NUFER,
LOTTE BECKMANN.